United States Patent [19]

Eppler et al.

[11] Patent Number: 5,707,008
[45] Date of Patent: Jan. 13, 1998

[54] HEATING DEVICE, IN PARTICULAR FOR VEHICLES

[75] Inventors: Hermann Eppler, Balingen; Monika Sigle, Wernau; Dirk Brenner, Stuttgart; Peter Steiner, Aichwald, all of Germany

[73] Assignee: J. Eberspächer GmbH & Co., Esslingen, Germany

[21] Appl. No.: 793,862

[22] PCT Filed: Feb. 1, 1996

[86] PCT No.: PCT/DE96/00170

§ 371 Date: Feb. 12, 1997

§ 102(e) Date: Feb. 12, 1997

[87] PCT Pub. No.: WO96/24504

PCT Pub. Date: Aug. 15, 1996

[30] Foreign Application Priority Data

Feb. 9, 1995 [DE] Germany .................. 195 04 180.1

[51] Int. Cl.$^6$ ................................ B60H 1/02
[52] U.S. Cl. ................. 237/12.3 A; 237/12.3 C; 126/56; 126/57
[58] Field of Search ............... 237/12.3 A, 12.3 C; 126/104 A, 56, 57; 431/202

*Primary Examiner*—Henry A. Bennett
*Assistant Examiner*—Derek S. Boles
*Attorney, Agent, or Firm*—McGlew and Tuttle

[57] ABSTRACT

A vehicle heater with a pot-shaped, double-jacketed heat exchanger and a burner for the fuel to be burned extending into the heat exchanger coaxially to an axis of the heat exchanger. The burner has a combustion chamber with a flame sensor disposed within it. A side channel fan is provided for feeding combustion air into the combustion chamber. The burner has a glow plug positioned to be swept by a small partial flow of the combustion air for igniting the fuel. The axis of the heat exchanger and an axis of the fan intersect each other approximately at right angles. The heat exchanger has a central opening closed by a one-part angle flange with a angle flange first leg and with a angle flange second leg extending approximately at right angles to the angle flange first leg. The angle flange first leg is located in a plane extending approximately in parallel to the axis of the heat exchanger and the angle flange second leg is located in a plane directed at right angles thereto. The angle flange second leg directly coveting the central opening of the heat exchanger.

13 Claims, 3 Drawing Sheets

Fig. 2

HEATING DEVICE, IN PARTICULAR FOR VEHICLES

FIELD AND BACKGROUND OF THE INVENTION

The present invention pertains to a heater, especially for vehicles, with, among other things, a pot-shaped, double-jacketed heat exchanger, into which a burner for the fuel to be burned extends coaxially to the axis of the heat exchanger, with a fan, which is especially a side-channel fan, for feeding combustion air into a combustion chamber of the burner, with a glow plug swept by a small partial flow of combustion air for igniting the fuel, and optionally with a flame sensor within the combustion chamber of the burner, in which heater the axes of the heat exchanger and of the fan intersect each other approximately at right angles.

SUMMARY AND OBJECTS OF THE INVENTION

It is an object of the invention to that the structural volume of such a device, which has been known from practice, shall be reduced, and manufacture of the device shall become more efficient. However, to make it possible to introduce the combustion air with a swift into the combustion chamber of the burner of the heat exchanger in the prior-art devices, a bladed distributor is provided axially in front of the combustion chamber of the burner. This implies an expensive design and leads, in addition, to a relatively large structural volume. Due to the radial extension of the glow plug for igniting the fuel to be fed into the burner of the heat exchanger, which has been common in the prior-art burners, the complicated design of the device is made additionally larger.

One important starting point for a solution to the above-mentioned problem consists of designing the device in such a way that the axes of the heat exchanger and of the fan of this type intersect each other approximately at right angles. This creates the prerequisite for an efficient and consequently low-cost and compact design of the heater of this type. It is thus possible, in particular, to achieve an especially considerable reduction in the number of individual parts needed to manufacture the heater, and the few remaining parts can be integrated into an extremely compact unit.

To accomplish this goal, the present invention provides for closing the central opening of the heat exchanger by a one-part angle flange containing a first leg forming a partial area of the fan and a second leg extending approximately at right angles thereto. This one-part angle flange practically assumes the function of a housing part, into which especially the fan can be integrated. The first leg of this angle flange extends in a plane extending approximately in parallel to the axis of the heat exchanger, and the second leg extends in a plane directed at right angles thereto. The second leg covers the opening of the heat exchanger with the burner located in it.

If the fan is designed as a side channel fan with a side channel divided axially into two halves, the half with the air inlet and outlet is integrated into the first leg of the angle flange directed in parallel to the axis of the heat exchanger.

Due to the closing of the heat exchanger opening with the second leg of the angle flange, in the first leg of which, extending at right angles thereto, a side channel fan is integrated, the combustion air can be introduced into the open front side of a tubularly designed combustion chamber in a swirled form with an extremely simple design. Only an air feed channel leading radially tangentially to the front side of the combustion chamber is to be integrated for this purpose in the open form into the front side of the second leg of the angle flange, which latter front side covers the heat exchanger opening. This channel is in direct connection with the outlet of the side channel of the fan arranged in the same angle flange. The air feed channel is closed on the circumference within the second leg of the angle flange when the angle flange is placed on the opening of the heat exchanger in such a way that it is covered by the heat exchanger and/or the combustion chamber.

In the design according to the present invention, the glow plug can be advantageously mounted in the second leg of the angle flange, which leads to a simple design, and it can extend into the burner in parallel to the axis of the heat exchanger and consequently also to the axis of the burner. This arrangement leads to the additional advantage that a simple connection channel, which is open toward the front side of the second leg, can be integrated between the glow plug and the feed channel for the combustion air in the front side of the second leg of the angle flange. This connection channel is again closed circumferentially by placing the angle flange on the opening of the heat exchanger, as a result of which pans of the heat exchanger and of the burner bring about the necessary closure of the connection channel. The connection channel is used to bring about a prior-art ventilation of the glow plug in a bypass flow to the combustion air flow.

The glow plug is located in a glow plug chamber, which openly joins the combustion chamber wall radially on the outside. The glow plug chamber is separated from the interior of the combustion chamber only via a fuel-absorbing lining of the combustion chamber. Due to the glow plug directly joining the fuel-absorbing lining of the combustion chamber, the glow plug chamber requires no fuel supply of its own. An ignition hole, which connects the two chambers, is located in the lining in the area in which the glow plug chamber is separated from the interior of the combustion chamber by the combustion chamber lining only. The air sweeping the glow plug can flow through this ignition hole from the glow plug chamber into the combustion chamber.

The waste gas to be removed from the heat exchanger leaves the heater through an outlet, which is also integrated into the second angle of the angle flange. A flame sensor, which is common in heaters of this type, may be mounted, extending coaxially to the heat exchanger, in the second leg of the angle flange in an extremely simple manner in terms of design.

The burner of the heat exchanger is arranged exclusively within the heat exchanger in the design of the heater according to the present invention, and it also extends slightly into the second leg of the angle flange with its junction area. The front side of the burner is located directly at the front surface of the second leg of the angle flange, and the front surface is, on the whole, e.g., flat.

The fastening of the heat exchanger may be achieved simply by clamping in between the opening edge of the heat exchanger and the angle flange, so that no special holding means are necessary for the burner.

The advantages that can be achieved with the present invention will be additionally discussed in detail in connection with the description of an exemplary embodiment, which is shown in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
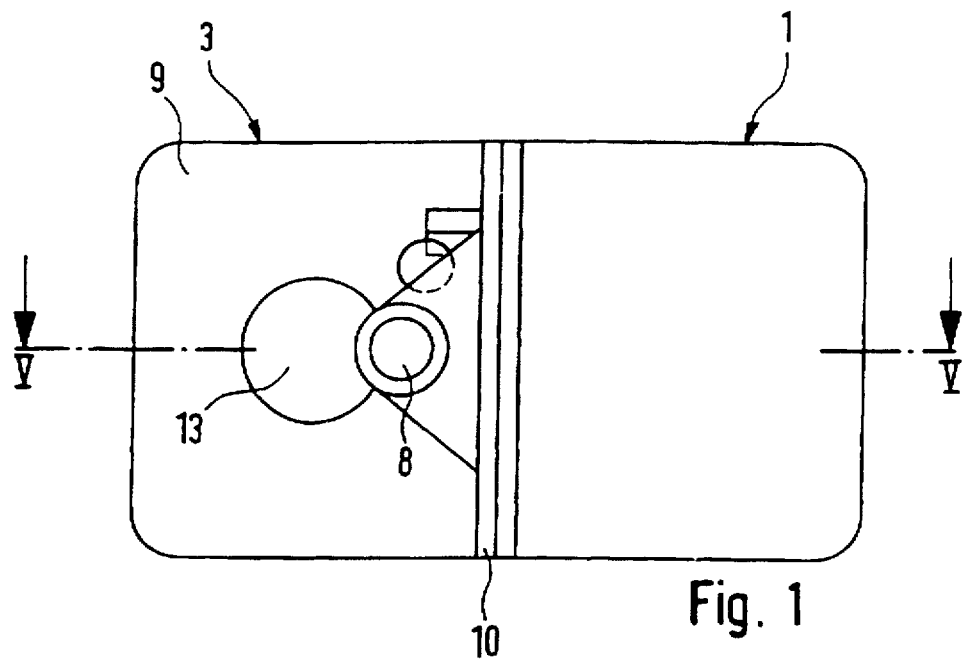
FIG. 1 is a bottom view of a heater with a side-channel fan arranged at right angles to the axis of the heat exchanger.

The heater comprises essentially two main parts, namely, a pot-shaped double-jacketed heat exchanger 1 with a burner 2 located in it, on the one hand, and an angle flange 3 with a side-channel fan 4, with a glow plug 5, with a flame sensor 6, with an air feed channel 7 and with a waste gas pipe branch 8, on the other hand. The combustion air removed from the waste gas pipe branch 8 is indicated by arrows A in the drawing.

The one-pan angle flange 3 consists of a first leg 9, which extends in a plane parallel to the axis of the heat exchanger 1, and of a second leg 10 directed at right angles thereto. With the angle flange 3 mounted on the heat exchanger 1, the second leg 10 tightly covers the opening of the heat exchanger 1 with its front side. The above-mentioned glow plug 5 as well as the flame sensor 6 are located in this second leg 10.

Figure 2:
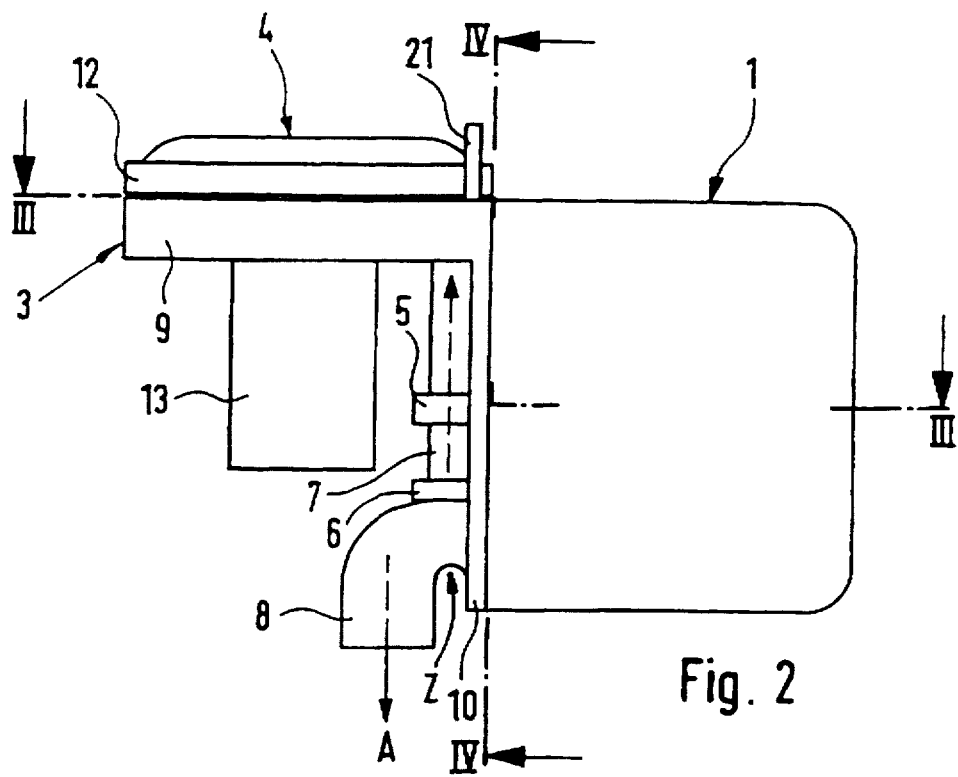
FIG. 2 is a front view of the heater according to FIG. 1.
Figure 3:
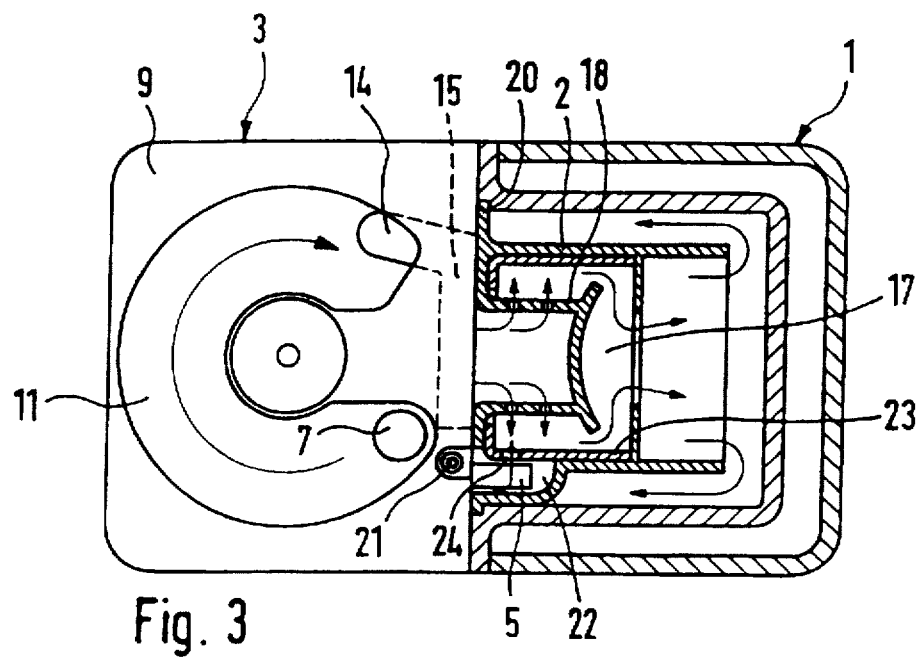
FIG. 3 is a sectional view through the heater along line III—III in FIG. 1.
Figure 4:
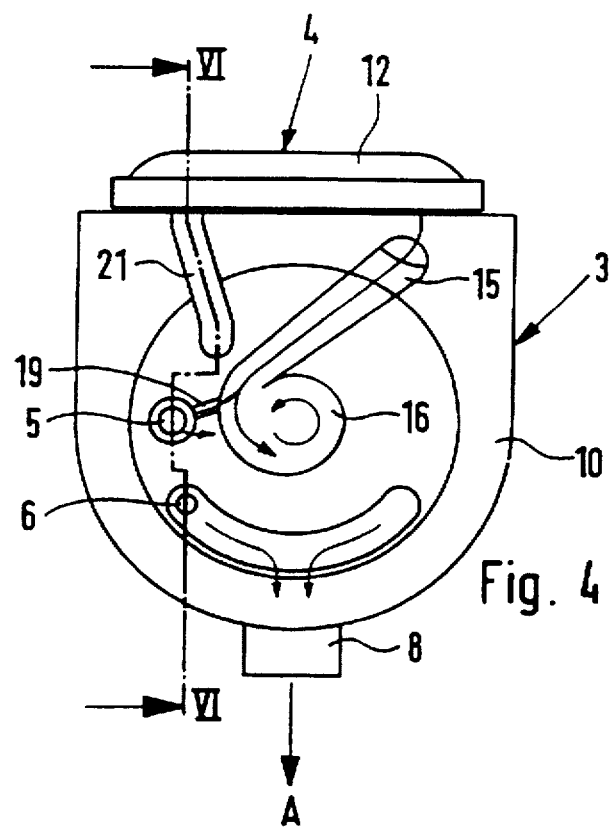
FIG. 4 is a sectional view through the heater along line IV—IV in FIG. 2.
Figure 5:
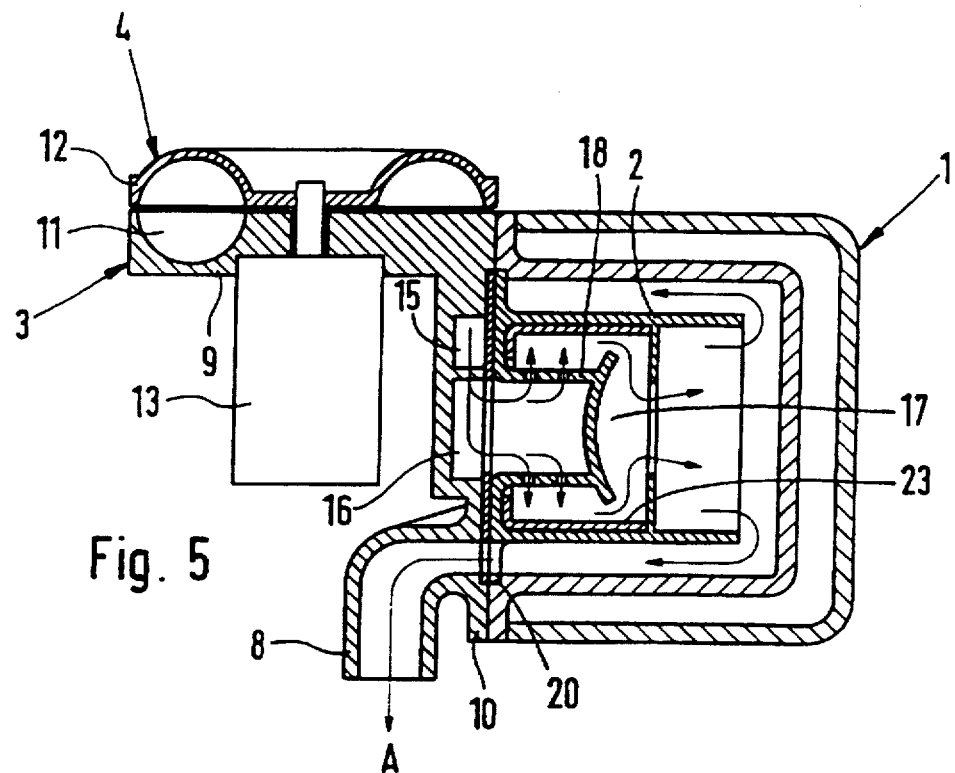
FIG. 5 is a sectional view exclusively through the fan along line V—V in FIG. 1.
Figure 6:
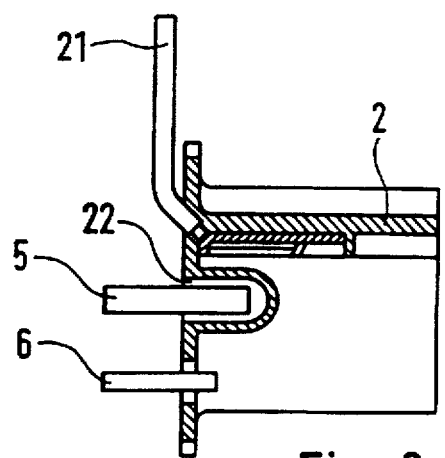
FIG. 6 is a sectional view exclusively through the burner along line VI—VI in FIG. 4.

The first leg 9 is the mounting part for the side-channel fan 4, and it already forms part of the fan 4 itself. Thus, the lower half of the side channel of the fan 4 with the air feed channel 7 of the fan is integrated directly into this first leg 9. This area of the side channel is designated by 11 in the drawing. The air to be drawn in for the burner passes through the air feed channel 7 in this area 11. The combustion air to be fed in is indicated by an arrow Z in FIG. 2. A fan wheel 12 of the side-channel fan 4, which is to be covered by a housing cover, is mounted in the first leg 9 and it accommodates the feed blades of the side-channel fan 4. A drive motor 13 for the fan wheel 12 is arranged, with an axis extending at right angles to the axis of the heat exchanger 1, at the first leg 9, namely, on the inside of that leg 9 facing the second leg 10.

The combustion air being fed in the fan 4 is fed to the burner 2 through an opening 14 leading from the side channel area 11 into the front side of the second leg 10. The combustion air being fed flows from the opening 14 through a feed channel 15 integrated openly into the front side of the second leg 10 and into a central, spiral swirl space 16, which passes openly over in the axial direction into a perforated pipe 18 of the combustion chamber 17 of a burner 2. The feed channel 15 extends radially in the front wall of the second leg 10 such that it opens approximately tangentially into the swirl space 16. The combustion air is thus introduced into the swirl space 16 in a swirling pattern in the most simple manner imaginable in terms of design. The feed channel 15 is closed circumferentially by front wall areas of the burner 2.

The glow plug 5 is mounted in the second leg 10 in parallel to the axis of the heat exchanger 1 and extends into a glow plug chamber 22, which is designed in the manner of a pocket and joins with a radially open area the cylindrical outer wall of the combustion chamber 2. A fuel-absorbing lining 23, which separates the glow plug chamber 22 from the combustion chamber 17, is located within the cylindrical outer wall of the combustion chamber 2. A radially extending ignition hole 24 is located within this area of the lining 23, which is located between the two chambers 17, 22. During ignition, the glow plug 5 acts directly on the fuel in the combustion chamber lining 23. As a result, the glow plug chamber 22 requires no separate fuel supply.

A connection channel 19, which is openly integrated into the front wall of the second leg 10 and can be called a plug-ventilating channel, ensures the ventilation of the glow plug 5 with a bypass flow, which is drawn off from the combustion air fed by the fan 4; with the angle flange 3 mounted on the heat exchanger 1, this connection channel 19 is closed circumferentially in the same manner as the feed channel 15.

The flame sensor 6 is also mounted in the second leg 10 and extends into a space between the burner 2 and the heat exchanger 1 in parallel to the axis of the heat exchanger 1 and consequently also in parallel to the glow plug 5.

The waste gas to be removed from the heat exchanger 1 is removed from the heat exchanger via the waste gas pipe branch 8 integrated into the second leg 10.

At its end facing the second leg 10, the burner 2 is provided with a radially projecting flange 20, via which it is mounted by clamping between the angle flange 3 and the heat exchanger 1.

Fuel is fed into the combustion chamber 17 of the burner 2 through a fuel line 21. An openly integrated groove is provided in the second leg to receive the fuel line 21.

The fuel is absorbed and evaporated by the combustion chamber lining 23. The fuel-air mixture formed can be ignited at the ignition hole 24 by the glow plug 5.

The special advantages of the embodiment of a heater according to the present invention, which was described above as an example, can be summarized once again as follows:

Compact assembly unit, which can be manufactured in an efficient manner, due to the axes of the fan and of the heat exchanger intersecting each other approximately at right angles, generation of a swirled combustion air feed flow in a simple manner in terms of design and over an optimally short flow path, which results in reduced flow losses, reduction in the electric power consumption of the fan due to reduced flow losses, short overall length of the heater, reduction in the amount of seals needed between individual parts due to a reduction in the number of parts and, as a consequence, a reduction in the effort needed for assembly, on the whole, a possibility of manufacturing the heater at a low cost.

While specific embodiments of the invention have been shown and described in detail to illustrate the application of the principles of the invention, it will be understood that the invention may be embodied otherwise without departing from such principles.

We claim:

1. A heater, comprising:
   a pot-shaped, double-jacketed heat exchanger;

a burner for the fuel to be burned extending into said heat exchanger coaxially to an axis of said heat exchanger, said burner having a combustion chamber; and a fan, for feeding combustion air into said combustion chamber said burner, having a glow plug positioned to be swept by a small partial flow of said combustion air for igniting the fuel, said axis of said heat exchanger and an axis of said fan intersecting each other approximately at right angles, said heat exchanger having a central opening closed by a one-part angle flange with a angle flange first leg and with a angle flange second leg extending approximately at right angles to said angle flange first leg, wherein said angle flange first leg is located in a plane extending approximately in parallel to said axis of said heat exchanger and said angle flange second leg is located in a plane directed at right angles thereto, said angle flange second leg directly coveting said central opening of said heat exchanger.

2. A heater in accordance with claim 1, wherein said fan is a side-channel fan with a side channel divided axially into two halves with a half which contains an air inlet and air outlet, said side-channel fan being integrated into said angle flange first leg.

3. A heater in accordance with claim 1, wherein said central outlet opens into a feed channel, which is integrated openly toward said heat exchanger into said angle flange second leg, wherein said feed channel leads radially tangentially into a centrally arranged swirl space, which is open toward said heat exchanger, and said feed channel is closed circumferentially, with said angle flange mounted on said heat exchanger, due to being in contact with areas of the said heat exchanger and/or of the said burner extending into the said heat exchanger, while said centrally arranged swift space openly passes over into said combustion chamber of said burner.

4. A heater in accordance with claim 1, wherein said glow plug extends coaxially to an axis of said combustion chamber, in said angle flange second leg.

5. A heater in accordance with claim 1, wherein said angle flange second leg has a connection channel, which is open in said angle flange second leg and can be closed circumferentially by an opposing area of the said heat exchanger and of said burner, said connection channel leading to said glow plug from said feed channel in said angle flange second leg.

6. A heater in accordance with claim 1, wherein said glow plug extends to a glow plug chamber openly joining a fuel-absorbing lining of said combustion chamber and said glow plug chamber is located adjacent to said combustion chamber lining.

7. A heater in accordance with claim 6, wherein a radial ignition hole connects said glow plug chamber to said combustion chamber lining in an area in which said glow plug chamber joins said combustion chamber lining radially openly.

8. A heater in accordance with claim 1, further comprising an outlet opening provided for waste gas leaving said heat exchanger in said angle flange second leg.

9. A heater in accordance with claim 8, wherein said outlet opening opens within said angle flange second leg into a waste gas pipe branch, in which waste gas is deflected by an angle of substantially 90°.

10. A heater in accordance with claim 1, further comprising a flame sensor extending into said heat exchanger mounted extending coaxially to said heat exchanger axis, in said angle flange second leg.

11. A heater in accordance with above claim 1, wherein said burner is arranged exclusively within said heat exchanger and is in contact with said angle flange second leg.

12. A heater in accordance with claim 1, wherein said burner is mounted fixed between said second leg of said angle flange and said heat exchanger via a flange projecting radially from said burner.

13. A vehicle heater, comprising:

a pot-shaped, double-jacketed heat exchanger;

a burner for the fuel to be burned extending into said heat exchanger coaxially to an axis of said heat exchanger, said burner having a combustion chamber;

a flame sensor disposed within said combustion chamber; and a side channel fan, for feeding combustion air into said combustion chamber, said burner having a glow plug positioned to be swept by a small partial flow of said combustion air for igniting the fuel, said axis of said heat exchanger and an axis of said fan intersecting each other approximately at right angles, said heat exchanger having a central opening closed by a one-part angle flange with a angle flange first leg and with a angle flange second leg extending approximately at right angles to said angle flange first leg, wherein said angle flange first leg is located in a plane extending approximately in parallel to said axis of said heat exchanger and said angle flange second leg is located in a plane directed at right angles thereto, said angle flange second leg directly coveting said central opening of said heat exchanger.

* * * * *